INVENTOR.
Leonard R. Crow,

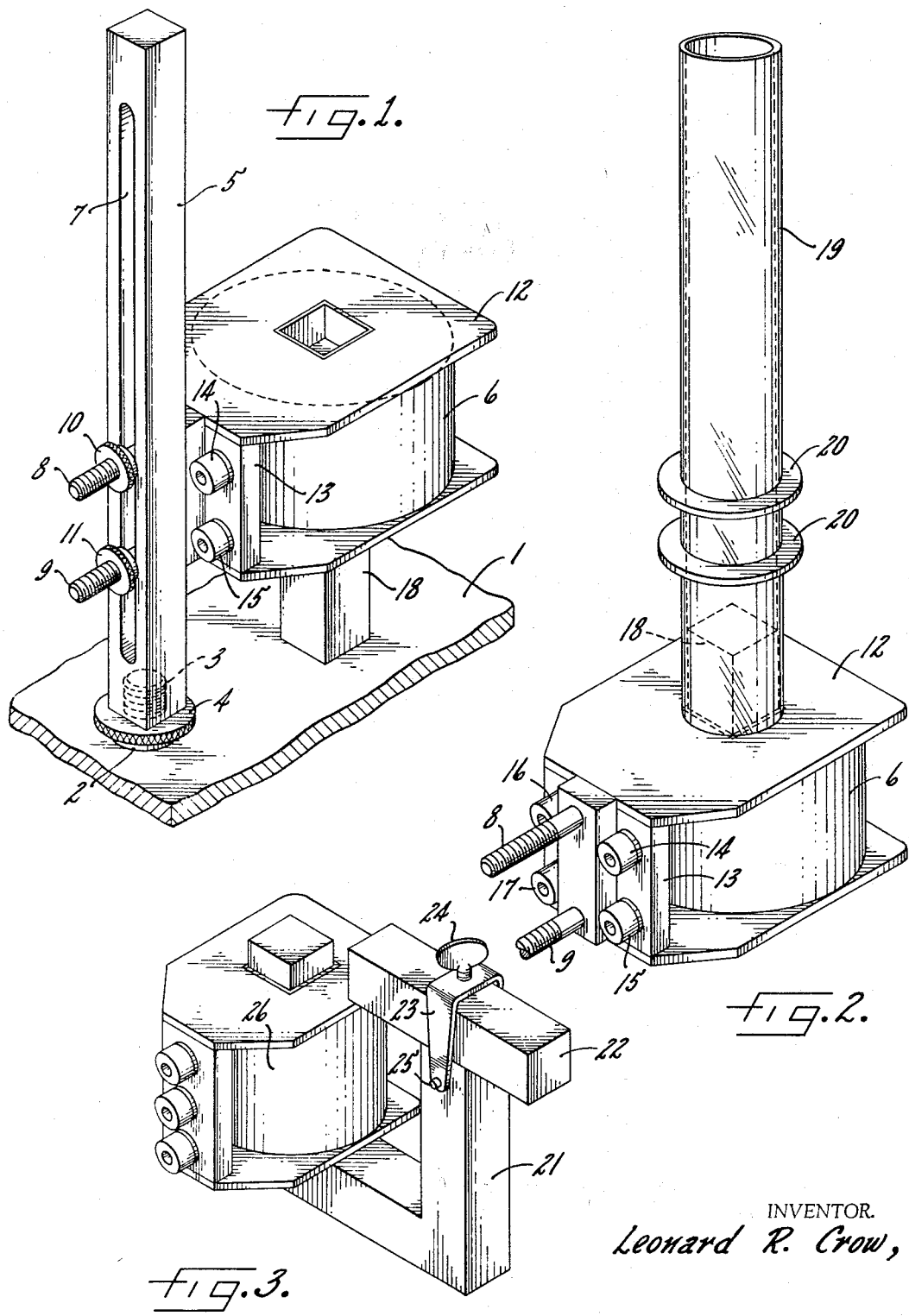

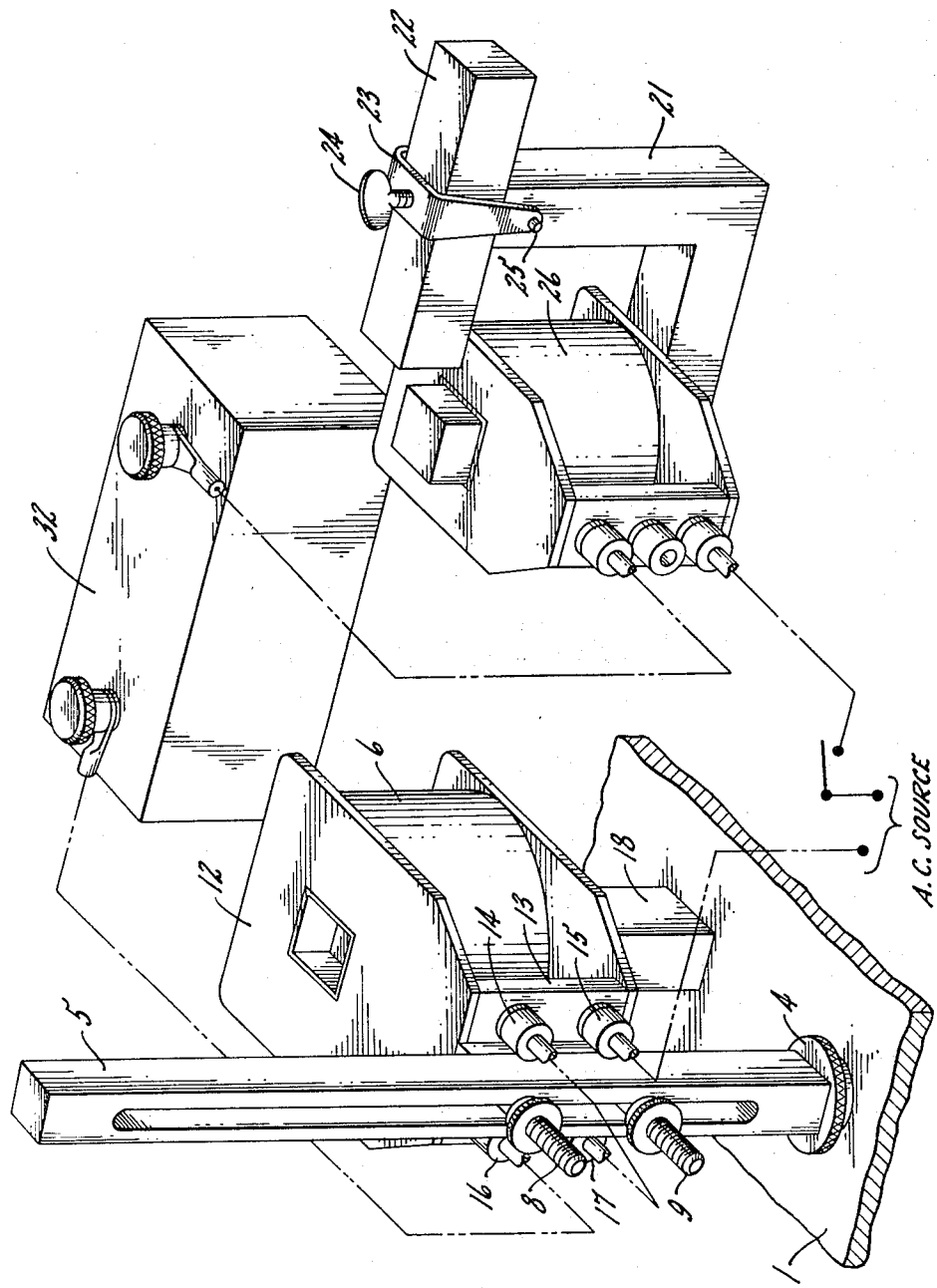

United States Patent Office 3,327,409
Patented June 27, 1967

3,327,409
ELECTRICAL RESONANT DEMONSTRATION APPARATUS
Leonard R. Crow, 530 S. 4th St., Vincennes, Ind. 47591
Filed Sept. 24, 1964, Ser. No. 398,926
9 Claims. (Cl. 35—19)

The present invention relates to educational devices, and more particularly to education devices in which applicant has developed standardized components capable of arrangement and rearrangement and regrouping to demonstrate a variety of electrical and electromagnetic phenomena.

It is well known that it is highly desirable to demonstrate various electrical electromagnetic and electromechanical results in conjunction with either classroom, individual or even self-training in the field of electricity and electromagnetism. Heretofore, in view of the complexity of existing structures, as well as money considerations, little effort has been directed to the development of the necessary versatile laboratory or lecture demonstration equipment. Moreover, in addition to the aforesaid objections to available instructional equipments, the latter were inherently incapable of proper demonstrations of more than one single phenomena, thereby diminishing any effective complete utilization thereof.

By virtue of the instant invention, the applicant has provided for novel educational devices having basic components which are interchangeable, as desired, to afford a variety of demonstration units for teaching various electrical and electromagnetic phenomena. The aforesaid objective is obtained through the use of improved type of electromechanical core structures which, together with other components, permits the ready assembly of a multitude of devices, and thereby avoids the expense which would otherwise be necessary to purchase and/or construct the equivalent number of individual devices.

The applicant's invention comprises a number of individual components which are simple and economical to manufacture and readily grouped in kit form to provide a convenient basis for electrical, electromagnetic and electromechanical phenomena demonstration purposes.

Accordingly, the principal object of the present invention is to provide for the assembly of a plurality of novel educational devices from a basic number of individual components.

A further object of the present invention is to provide means of showing a multiplicity of educational principles and phenomena with a few specially designed and interchangeable basic components which may be quickly assembled and disassembled for serving alternate or substitute purposes.

A still further object of the present invention is to provide for versatile demonstration in basic electricity, electromagnetism and electromechanics, but most important of all is to provide novel and useful means to demonstrate certain phenomena in conjunction with electrical resonance and the oscillatory mechanical vibrations that may be sent up therewith in a manner which have never before been demonstrated in the entire field of electrical resonance.

Other objects and a better understanding of the invention will become more apparent from the following description taken in conjunction with the accompanying drawings, wherein:

FIGURE 1 is a perspective view showing the double winding inductance coil with its terminal arrangement and combination of means of elevating it above and in different relative positions with relation to its supporting baseboard according to the teaching of the instant invention.

FIGURE 2 is a perspective view of the double winding inductance coil (as shown in FIGURE 1) excepting that the upright slotted post has been removed to show a clear view of the clamping studs, insulative panel and detailed view of the four terminals of the double winding coil.

FIGURE 3 is a perspective view showing the variable reactor that is used in the circuits for control thereof as later explained.

FIGURE 4 is a perspective view showing the arrangement of components and circuitry for production of mechanical oscillations of a magnetizable core and means of control of both the period and the amplitude of the oscillating core according to the teaching of instant invention.

Figure 5:
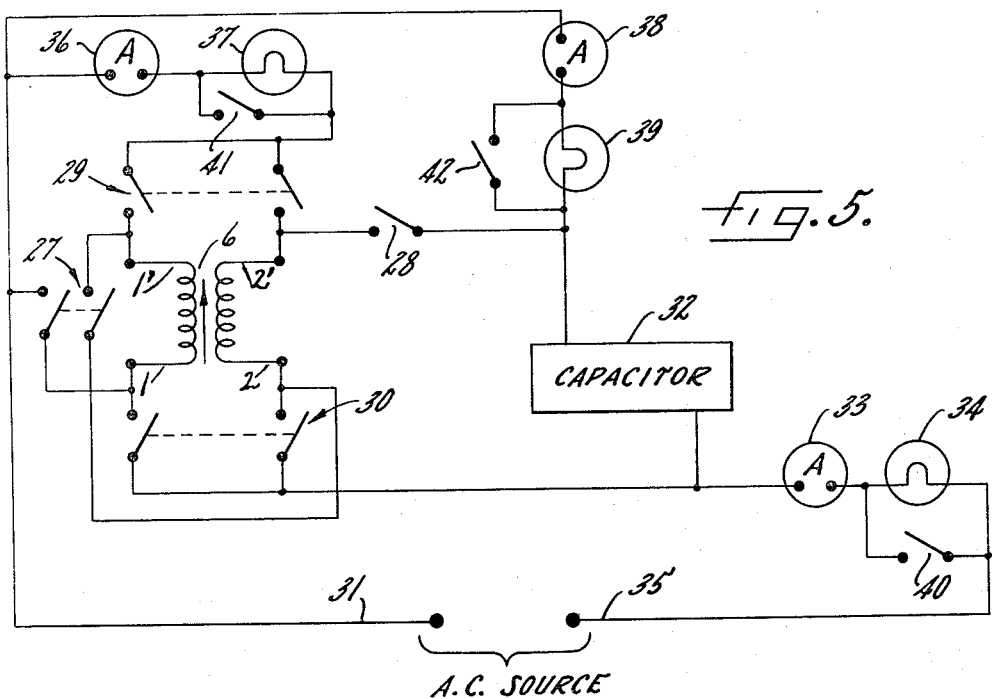
FIGURE 5 is a circuit diagram showing the components and circuitry of instant invention necessary to produce and demonstrate parallel resonant phenomena and means for converting the component combinations to a series resonant demonstration circuit and demonstration thereof.

In order to make clear an understanding of applicant's invention, reference will now be made to the embodiments illustrated by the drawings, and definite descriptive language will be used to describe the invention. It is to be understood that no limitation of the scope of the invention is intended, such alterations and further modifications of the illustrated devices therein being contemplated as would normally occur to one skilled in the art to which this invention relates.

Reference is made to FIG. 1 in which a base 1 (shown in cutaway section) made of any suitable non-magnetic non-conductive material is provided with a stationary or fixed screw socket 2 of any suitable material, securely fastened to the base 1 by screws or other suitable means; a stud 3 properly threaded to engage with internal threads through and within screw socket 2; a jamb nut 4 suitably threaded to engage with threads on stud 3. Jamb nut 4 is provided for the purpose of locking threaded stud 3 and screw socket 2 securely together when sufficiently engaged. This engagement of socket 2, threaded stud 3 and jamb nut 4 provides means of rotatably positioning coil 6 in any desired position over the base 1.

Threaded stud 3 is further provided for engagement with an insulative upright post 5 by means of a drive fit or a socket fit within lower end of upright post 5. Insulative upright post 5 is further provided with a slot 7 therethrough to provide means whereby clamping studs 8 and 9 may be slid up or down therein and therealong on insulative post 5 and secured thereto by knurled nuts 10 and 11.

Coil 6 is preferably wound on an insulative bobbin or spool 12. Coil 6 is preferably wound with two insulative conductors in parallel to form two separate windings in order to permit their being connected inductively either in parallel or in series for certain applications which will be later explained. With further reference to FIGURE 1, applicant provides nuts 10 and 11 so that coil 6 can be moved down upon the baseboard 1 or away from the base any distance required or desired and quickly and easily fastened rigidly and securely thereto by merely tightening threaded nuts 10 and 11 securely against upright 5.

FIGURE 2 shows the bobbin or spool 12 further provided with a small insulative panel 13 to which is secured the four end connections of the two windings constituting coil 6. The beginning of one winding of the coil 6 is connected to terminal 14 while its other end is connected to terminal 15. The beginning end of the second winding of coil 6 is connected to terminal 16 and its other end connected to terminal 17.

If terminal 15 and 16 of coil 6 are connected together, then the two windings are connected in series inductively. However, if terminals 14 and 16 were connected together and terminals 15 and 17 were connected together, then the two windings would be connected in parallel (aiding) inductively. This parallel connection becomes necessary for certain applications of the coil as will be shown later.

In FIGURE 2 applicant further shows an insulative non-magnetic tube 19 (preferably transparent) surrounded and placed over upper portion of core 18; washers or rings 20 (preferably aluminum) or other material of good electrical conductivity are placed upon tube 19. The manner in which the core 18; tube 19 and conductive washers 20 function to produce mechanical oscillation of said washers when the coil 6 is properly excited in conjunction with other components will be fully explained later.

FIGURE 3 shows in front side elevation the variable reactor that is used for control of circuitry components in a manner to be explained in detail later. The variable reactor consists of a U-shaped magnetizable core 21; a movable or adjustable straight core 22; a clamp 23; a thumb screw 24; pin 25 and a coil 26.

FIGURE 4 shows one form of applicant's invention in which the coil 6 is positioned a few inches above the baseboard so that the core 18 remains within the coil but only partially within it. Coil 6 is rigidly fastened to the upright 5 so that while core 18 rests upon the base 1 only about one-fourth of the total length of the core remains within the lower portion of the coil.

To illustrate how the components shown in FIGURE 4 may be used to demonstrate certain laws, principles, theory and phenomena associated with electrical resonance, applicant shows a series resonant circuit in which a double winding inductance coil 6 with a movable magnetizable core 18 is connected in series with a capacitor 32 and a variable or adjustable reactor; said reactor consisting of a coil 26 placed on a U-shaped core 21 of magnetizable material and an adjustable or movable core 22 and a clamping arrangement provided for securely fastening cores 21 and 22 together at any desired position of required inductance. Let us assume that the movable core 22 of the variable reactor is now adjusted so that the circuit is in a resonant condition with the core 18 reclining with its lower end upon the base 1; if when in this condition the circuit is suddenly energized the core 18 will be instantly and forcefully pulled (jerked) into the coil, because the circuit, now adjusted to resonance, permits maximum current flow, and therefore strong magnetic force produced to pull core 18 within the coil. As the core is pulled into coil 6, it increases the coil's inductance, until when pulled far enough within the coil, the inductance becomes so great that the reduced current becomes so small that the coil's magnetic field will no longer sustain the cores weight and it falls down upon the base 1. In this position the core again, by its position in the coil, tunes the circuit so that maximum current again flows through the coil and again jerks the core into the coil as before, and thus the cycle of operation is repeated over and over so long as the circuit is closed and the components of the circuit remain unaltered.

Suppose now that the variable reactor is again altered until the circuit is adjusted to a resonant or near resonant condition with the lower end of the core 18 a considerable distance above the base 1, but yet only partially within the coil 6. With the circuit now in this newly adjusted condition, the core 18 will again be pulled (jerked) within the coil 6, but the circuit begins to be detuned with the core much farther within the coil than before and, in fact, may well be almost completely within the coil before the degree of detuning is sufficient to permit the core to fall toward the base. However, as the core falls toward the base, it now causes the circuit to be tuned to maximum current flow while the core is still a considerable distance above the base 1. Therefore, the magnetic field becomes so strong that it arrests the downward movement of the falling core before it hits the base and pulls (jerks) it back again into the coil 6. Now the cycle of operation is repeated over and over; and the core continues to oscillate back and forth within the coil, suspended in mid air, without touching the base at any time. This oscillation of the core in mid air continues so long as none of the circuit components are altered.

By various suitable adjustments of movable core 22 of the variable reactor, then core 18 may be made to vary its amplitude of oscillation (vibration) from a very small fraction of an inch (in mid air) to a very great amplitude of several inches, and through this varying change of operational amplitude, the core's period of oscillation (vibration) can be changed from one so very rapid that the eye can scarcely follow it (when the amplitude is very short) to a period of just a very few per minute (when the amplitude is very great, as it is when it falls near or upon the base with each oscillation).

Applicant, thus far, has not disclosed all the special applications of the double winding of coil 6 when its windings are connected in parallel aiding (inductively). However, as in various applications relative to those already discussed, many further variations are possible and modifications arranged, as, for illustration, where less inductance is to be found to advantage, in certain experiments, that could be arranged with the units if connected as shown in FIGURE 5. In such instance, the desired result could be accomplished by connecting the two windings of coil 6 in parallel aiding. Also, it is to be noted that coil 26 is provided with three jacks or socket outlets. Since the center jack of this coil 26 is not at the mid-point of the winding, but is at a point that permits use of either 40%, 60%, or 100% of the windings, by a suitable arrangement of the components incorporating the two coils 6 and 26 almost any conceivable experiment can be arranged within the size or capacity limitations of the components.

In most instances for which applicant's invention is intended, for general experimental requirements, a variable capacitor is not necessary in event the other components are correctly designed, to begin with, for a capacity within certain fixed limitations of the unit's power consumption.

FIGURE 5 is a disclosure of applicant's invention in which it makes possible the use of only one inductance coil, where two coils would otherwise be required to demonstrate both parallel and series resonance.

In a parallel resonance circuit the current from the power source is small compared to that in the parallel branch and its value would approach zero as the value of the ohmic resistance of the resonating circuit approaches zero. For this reason, it is obvious that any effective and valuable worthwhile demonstrations of parallel resonance should have the ohmic resistance of the resonating circuit as near zero as possible. Therefore, the valuable application of the double winding coil which permits the windings to be connected in parallel in order to reduce the coil's resistance at least to one-half.

The reduction of ohmic resistance in the inductive branch of a parallel resonant circuit permits less current to flow from the power source which is just what is desirable to demonstrate in using capacitors to correct power factor of commercial alternating current inductive circuits, as well as many applications where parallel resonance is used advantageously.

However, for demonstrations involving series resonance, applicant's use of the double winding coil, with its two windings series connected, is ideal for here the essential required advantage is in the use of many turns of inductance.

For disclosure of means of accomplishing effective use of the double winding coil in resonance circuits, both series and parallel, reference is made to FIGURE 5. To show this with one arrangement of fixed circuitry, switches 27 and 28 are closed for the use of series resonance demonstrations, while switches 29 and 30 remain open. For parallel resonance demonstrations, switches 28 and 27 are left open, and switches 29 and 30 are closed.

To trace the current flow through the circuitry used as a series resonant circuit, the current flow may be assumed to start at terminal lead 31 and flow through the left hand blade of switch 27 into terminal 1 of coil 6 out through terminal 1' down through the right-hand blade of switch 27 and to terminal 2 of coil 6, then out of terminal 2' around through switch 28 to one terminal of the capacitor 32, thence through the capacitor and through ammeter 33 out through lamp 34 to terminal lead 35 to the source.

To trace the current flow through the inductive branch of the parallel resonant circuit, it will be necessary that now switches 27 and 28 are opened while switches 29 and 30 are closed. The current flow may now be assumed to start at terminal lead 31 and flow through ammeter 36 through lamp 37 thence through both blades of switch 29 down through coil terminals 1' and 2' in parallel, and through coil 6 thence out of coil terminals 1 and 2 in parallel on through switch 30 and ammeter 33 and on through lamp 34 and terminal lead 35 to the source.

To trace the current flow through the capacitive branch of the parallel resonant circuit, let it be assumed we start at terminal lead 31 thence through ammeter 38 down through lamp 39 and through capacitor 32 and ammeter 33 through lamp 34 and lead 35 back to the source.

As a matter of visual demonstration and for analysis of both series resonant and parallel resonant phenomena, principles and applications, ammeters are provided; one in the inductive branch and one in the capacitive branch, while a third is located in the power source of the circuit. The power source ammeter 33 indicates the total input current at all times while the ammeter 36 indicates the amount of current flow through the inductive branch and ammeter 38 indicates current flow through the capacitive branch.

Lamps 34, 37, and 39 are used as visual indicators and may be shorted out at any time by use of their respective short circuiting switches 40, 41, and 42 when it is desirable to get an accurate current reading of the meters.

The lamps are good visual indicators to a class of students that are too far away to read the meter indications. Both the meters and the lamps show very distinctly that in a series resonant circuit the current from the input source is far smaller than in the parallel branches which it feeds. This circuitry and components provide a most excellent means of plotting all types of graphs applicable to both parallel and series resonant circuits.

Figure 6:
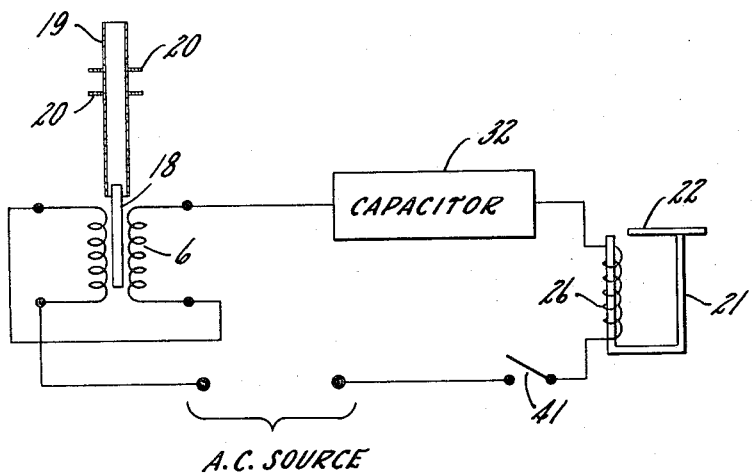
FIGURE 6 is a circuit diagram showing the components and circuitry of applicant's invention arranged for producing oscillation of conductive elements (washers) by use of a series resonant circuit of low frequency and means of varying either or both the period or the amplitude of said oscillations.

FIGURE 6 is a schematic circuitry view showing how components that are shown in FIGURES 2 and 3 may be combined in a series resonant electrical circuit to demonstrate automatic tuning and detuning of a low frequency circuit by the use of conductive, movable, short circuited secondary (conductive washers) in association with the double winding coil used in the circuitry combination.

With further reference now to FIGURE 6 let us assume that the two washers 20 are lowered together near the upper end of core 18 and with the circuit closed and the reactor adjusted (by use of movable core 22) until maximum current flows through the circuit (which will be at resonance when the circuit is tuned).

The current induced in the washers 20 will now be maximum since the inducing current in the primary winding 6 is now maximum. With switch 41 still closed, raise the washers 20 to the upper end of the tube 19. The circuit is now detuned and less current flows through winding 6 because of the removal of the secondary (washers) from the magnetic field of the primary 6. Now suddenly release the washers so that they fall down into the magnetic field at the upper end of core 18.

When the washers fall into this magnetic field of core 18, their presence again tunes the circuit to resonance; maximum current instantly flows through the circuit and maximum current is again induced into the washers. Now the strong magnetic field of the washers and the strong magnetic field of the core react to produce a violent repulsion of the washers upward and out of the magnetic field which again detunes the circuit; and when the washers again fall back into the magnetic field of the core 18, the cycle of operation is repeated and so the washers continuously and automatically fall into this magnetic field and are repelled therefrom so long as the circuit is energized.

Now the very important and unique feature of this arrangement of components is the adjustment in the amplitude and period of oscillation of washers through the distance in which they operate. By adjustment of the movable core 22 of the variable reactor, the washers may be made to vibrate or oscillate through a great distance of many inches, down to a very small amplitude of a fractional part of one inch. (Applicant has produced oscillations of washers through a distance of eight feet down to the small fractional part of an inch, the movement of which was almost imperceptible to the normal eye.) Applicant has worked with and used various types of variacs, variable transformers, resistors and what-not, in experiments on this subject, but found nothing even approaching the flexibility and utility of the manually controlled variable or movable core reactor; from the standpoint of demonstration value.

Additionally, an equally important and highly entertaining and educational feature is accomplished by having a divisible secondary (washer) arrangement. A kit of this equipment when supplied for use should be provided with at least five or six inductors (conductive washers), because with any given fixed adjustment of the reactor core, each additional washer dropped onto the other or others will produce its valuable, surprising and added effect upon the resultant action by changing the amplitude and period of oscillation even with an otherwise fixed circuitry.

The educational training device described hereabove is susceptible to various changes within the spirit of the invention. For example, the training aids discussed in the instant application are actually only representative of the many other training aid combinations possible of assembly with the components disclosed. Thus, the above description should be considered as illustrative and not as limiting the scope of the following claims.

I claim:
1. An educational electrical training aid in the form of an electrical resonant demonstration device comprising a double winding inductance coil with removable core therein; a capacitor; a manually operable movable core variable reactor; an insulative tube in engagement with the upper end of said double winding coil; core of said inductance coil positioned with its lower end in said coil and with its upper end protruding into the lower end of said tube; one or more conductive washers or other conductive elements placed upon said tube and slidable thereon; means for energizing said components to produce mechanical oscillations of said washers or conductive elements and means provided for gradual variation of both the period and amplitude of oscillation of said washers.

2. An educational electrical training aid in the form of an electrical resonant demonstration device comprising a single winding inductance coil with a magnetizable core therein; a capacitor; a manually operable movable core variable reactor; said inductance coil, capacitor and movable core reactor connected in series; an insulative tube in engagement with the upper end of said single winding inductance coil; core of said inductance coil positioned with its lower end in said coil and with its upper end protruding into the lower end of said insulative tube; conductive rings or washers placed upon said tube and slidable thereon; means for energizing said circuit and components to produce oscillations of said conductive washers.

3. An educational training aid in the form of an electrical resonant demonstration device comprising an inductance coil with a core of magnetizable material; a capacitor; a variable reactor; an insulative tube in engagement with the upper end of said inductance coil; core of said inductance coil positioned with its lower end in said coil and with its upper end protruding into the lower end of said insulative tube; one or more conductive rings or washers placed upon said tube and slidable thereon; means for energizing said components to produce oscillatory movement of said conductive washers upon said tube; means for controlling and varying the amplitude and period of oscillation of said conductive washers or rings.

4. An educational training aid in the form of an electrical resonance demonstration outfit comprising an inductance coil with a magnetizable core therein; a capacitor; a variable reactor; said inductance coil, capacitor and variable reactor connected in series; an insulative tube in engagement with the upper end of said inductance coil; core of said inductance coil positioned with its lower end protruding down into said coil and with its upper end protruding up into the lower end of said insulative tube; conductive washers or rings placed upon said tube and slidable thereon; means for energizing said components for demonstration of various resonant phenomena, principles and applications.

5. An educational electrical training aid in the form of an electrical resonance demonstrator comprising a double winding inductance coil with a magnetizable core therein; means provided for adjustably positioning said inductance coil above a fixed base and in relation to said movable core; means provided for connecting the two windings of said inductance coil in either series or parallel aiding; adjustable inductive means provided for changing the period and amplitude of oscillation of the movable core within the said inductance coil when electrically energized and means for energizing said components and circuitry to produce oscillations of said movable core within said inductance coil.

6. An educational electrical teaching aid in the form of an electrical resonance demonstration device comprising a double winding inductance coil with movable core therein; means provided for adjustably positioning said double winding inductance coil above a fixed base and in relation to said movable core; a capacitor; a variable reactor; means of connecting the inductance coil, capacitor and variable reactor in series and means of electrically energizing said components to produce oscillations of said movable core within the double winding coil; means provided for controlling and varying the amplitude and period of oscillation of said movable core within said inductance coil when energized.

7. An educational electrical training aid in the form of an electrical resonant demonstration unit comprising an inductance coil with a magnetizable core therein; a capacitor; a variable reactor; said inductance coil, capacitor and variable reactor connected in series; an insulative tube in engagement with the upper end of said inductance coil; core of said inductance coil positioned with its lower end in said inductance coil and with its upper end protruding into the lower end of said insulative tube; a sectionalized movable conductive element placed upon said tube and slidable thereon; means for increasing or decreasing the conductivity of said sectionalized movable conductive element by removal or addition of sections of said sectionalized conductive element; means for energizing said circuit and components to produce oscillations of said conductive secondary element.

8. An educational electrical training aid in the form of an electrical resonant demonstration device comprising a double winding inductance coil with a magnetizable core therewithin; a capacitor; an insulative tube in engagement with the upper end of said double winding inductive coil; core of said inductance coil positioned with its lower end in said inductive coil and with its upper end protruding into the lower end of said insulative tube; a conductive movable element placed upon said tube and slidable thereon; means for energizing said components to produce mechanical oscillations of said conductive movable element and means for variation of both the period and amplitude of oscillation of said movable conductive element.

9. An educational electrical teaching aid in the form of an electrical resonant demonstration device comprising a double winding inductive coil having a magnetizable core therewithin; a capacitor; a variable reactor; a conductive movable element; an insulative tube; means provided for energizing said coil, capacitor and reactor whereby mechanical oscillations are set up of the said movable conductive element.

References Cited

UNITED STATES PATENTS

| 1,182,636 | 5/1916 | Burns | 35—19 |
| 2,866,276 | 12/1958 | Zumwalt | 35—19 |

OTHER REFERENCES

Chicago Apparatus Company, Catalogue Number 44 entitled "Science Laboratory Equipment," received Science Library, July 1933, pages 46, 47, 60, 61 relied on.

Library of Congress No. Q, 1855, c533.

EUGENE R. CAPOZIO, *Primary Examiner.*

H. S. SKOGQUIST, *Assistant Examiner.*